(12) United States Patent
Ponnusamy et al.

(10) Patent No.: US 11,386,433 B2
(45) Date of Patent: Jul. 12, 2022

(54) METHOD AND SYSTEM FOR MANAGING MEMBERSHIP OF COMMUNICATION CHANNELS ASSOCIATED WITH PROJECTS OF AN ENTERPRISE ENTITY

(71) Applicant: Clari Inc., Sunnyvale, CA (US)

(72) Inventors: Rajkumar Ponnusamy, Sunnyvale, CA (US); David Bao, Sunnyvale, CA (US)

(73) Assignee: CLARI INC., Sunnyvale, CA (US)

( * ) Notice: Subject to any disclaimer, the term of this patent is extended or adjusted under 35 U.S.C. 154(b) by 611 days.

(21) Appl. No.: 15/462,314

(22) Filed: Mar. 17, 2017

(65) Prior Publication Data
US 2018/0268416 A1 Sep. 20, 2018

(51) Int. Cl.
*G06Q 10/06* (2012.01)
*G06Q 10/10* (2012.01)
*G06Q 30/00* (2012.01)

(52) U.S. Cl.
CPC ............. *G06Q 30/01* (2013.01); *G06Q 10/06* (2013.01); *G06Q 10/06311* (2013.01); *G06Q 10/06316* (2013.01); *G06Q 10/063112* (2013.01); *G06Q 10/063114* (2013.01); *G06Q 10/063118* (2013.01); *G06Q 10/10* (2013.01); *G06Q 10/1095* (2013.01); *Y02P 90/80* (2015.11)

(58) Field of Classification Search
None
See application file for complete search history.

(56) References Cited

U.S. PATENT DOCUMENTS

| 6,578,005 B1* | 6/2003 | Lesaint ................. G06Q 10/06 705/7.14 |
| 9,239,719 B1* | 1/2016 | Feinstein ............... G06Q 10/00 |
| 2004/0015556 A1* | 1/2004 | Chopra ................. G06Q 10/10 709/206 |
| 2005/0038687 A1* | 2/2005 | Galdes ................ G06Q 10/107 709/206 |

(Continued)

OTHER PUBLICATIONS

Maurer et al. "Merging Project Planning and Web-Enabled Dynamic Workflow Technologies", IEEE Internet Computing, vol. 4, Issue 3, pp. 65-74, Jun. 2000. (Year: 2000).*

(Continued)

*Primary Examiner* — Rutao Wu
*Assistant Examiner* — Sarjit S Bains
(74) *Attorney, Agent, or Firm* — Womble Bond Dickinson (US) LLP

(57) ABSTRACT

According to one embodiment, a customer relationship management (CRM) system is queried to obtain a list of projects that are associated with a particular user. A subset of the projects is selected from the list. Each of the projects in the subset includes an attribute that has been set to a predetermined attribute value or attribute state by the user (e.g., flagged, starred, a checkbox). For each of the projects in the subset, a communication channel (e.g., an instant messaging or IM system, an email group, a group chat, a social network community) associated with the project is identified. It is determined whether the user is already a member of the communication channel. If the user is not a member of the communication channel, the user is automatically added to the communication channel without user intervention from the user.

22 Claims, 9 Drawing Sheets

(56) References Cited

U.S. PATENT DOCUMENTS

| | | | | |
|---|---|---|---|---|
| 2005/0114829 A1* | 5/2005 | Robin | G06Q 10/06 | 717/101 |
| 2006/0085220 A1* | 4/2006 | Frank | G06Q 10/0631 | 705/310 |
| 2007/0250377 A1* | 10/2007 | Hill | G06Q 10/06311 | 705/7.13 |
| 2007/0282658 A1* | 12/2007 | Brintle | G06Q 10/06 | 705/7.15 |
| 2008/0077593 A1* | 3/2008 | Abrams | G06Q 10/06 | 707/999.009 |
| 2009/0234686 A1* | 9/2009 | Chakra | G06Q 10/06 | 705/325 |
| 2009/0287532 A1* | 11/2009 | Cohen | G06Q 10/06311 | 705/7.14 |
| 2011/0010340 A1* | 1/2011 | Hung | H04L 51/22 | 707/623 |
| 2011/0264483 A1* | 10/2011 | Nezhad | G06Q 10/0633 | 705/7.27 |
| 2012/0173638 A1* | 7/2012 | Vymenets | G06Q 10/103 | 709/206 |
| 2012/0215578 A1* | 8/2012 | Swierz, III | G06Q 50/205 | 705/7.14 |
| 2013/0080201 A1* | 3/2013 | Miller | G06Q 10/00 | 705/7.15 |
| 2013/0246119 A1* | 9/2013 | Slaughenhoupt | G06Q 50/08 | 705/7.27 |
| 2013/0318533 A1* | 11/2013 | Aghassipour | G06Q 10/06311 | 718/103 |
| 2013/0318589 A1* | 11/2013 | Ford | H04L 63/08 | 726/7 |
| 2014/0012616 A1* | 1/2014 | Moshenek | G06Q 10/063114 | 705/7.15 |
| 2014/0156757 A1* | 6/2014 | Zhang | H04L 12/1822 | 709/204 |
| 2015/0178666 A1* | 6/2015 | Green | G06Q 10/063114 | 705/7.15 |

OTHER PUBLICATIONS

Chen et al. "A Collaborative Project Management Architecture", Proceedings of the 36th Annual Hawaii International Conference on System Sciences, 2003, vol. 2, pp. 15a. (Year: 2003).*

* cited by examiner

… (1) …

METHOD AND SYSTEM FOR MANAGING MEMBERSHIP OF COMMUNICATION CHANNELS ASSOCIATED WITH PROJECTS OF AN ENTERPRISE ENTITY

FIELD OF THE INVENTION

Embodiments of the present invention relate generally to project management. More particularly, embodiments of the invention relate to automatically managing memberships associated with projects of an enterprise entity.

BACKGROUND

A user, when trying to do a project with another organization, leverages a team of people from his/her own organization throughout the project process. There is a constant need to communicate with the right people in his/her organization and also to keep the most relevant people up to date about what is happening with the project.

Although project specific communication platforms such as instant messaging exist, none of them tackle the problem of automatically bringing together the most relevant people for a specific project. Most of these other solutions are not intelligently managed and involve several manual steps. Project managers must know which projects they need to follow up on, and users must know who they need to reach out to in order to leverage these platforms. This results in low adoption of those tools.

BRIEF DESCRIPTION OF THE DRAWINGS

Embodiments of the invention are illustrated by way of example and not limited to the figures of the accompanying drawings in which like references indicate similar elements.

DETAILED DESCRIPTION

Figure 1A:
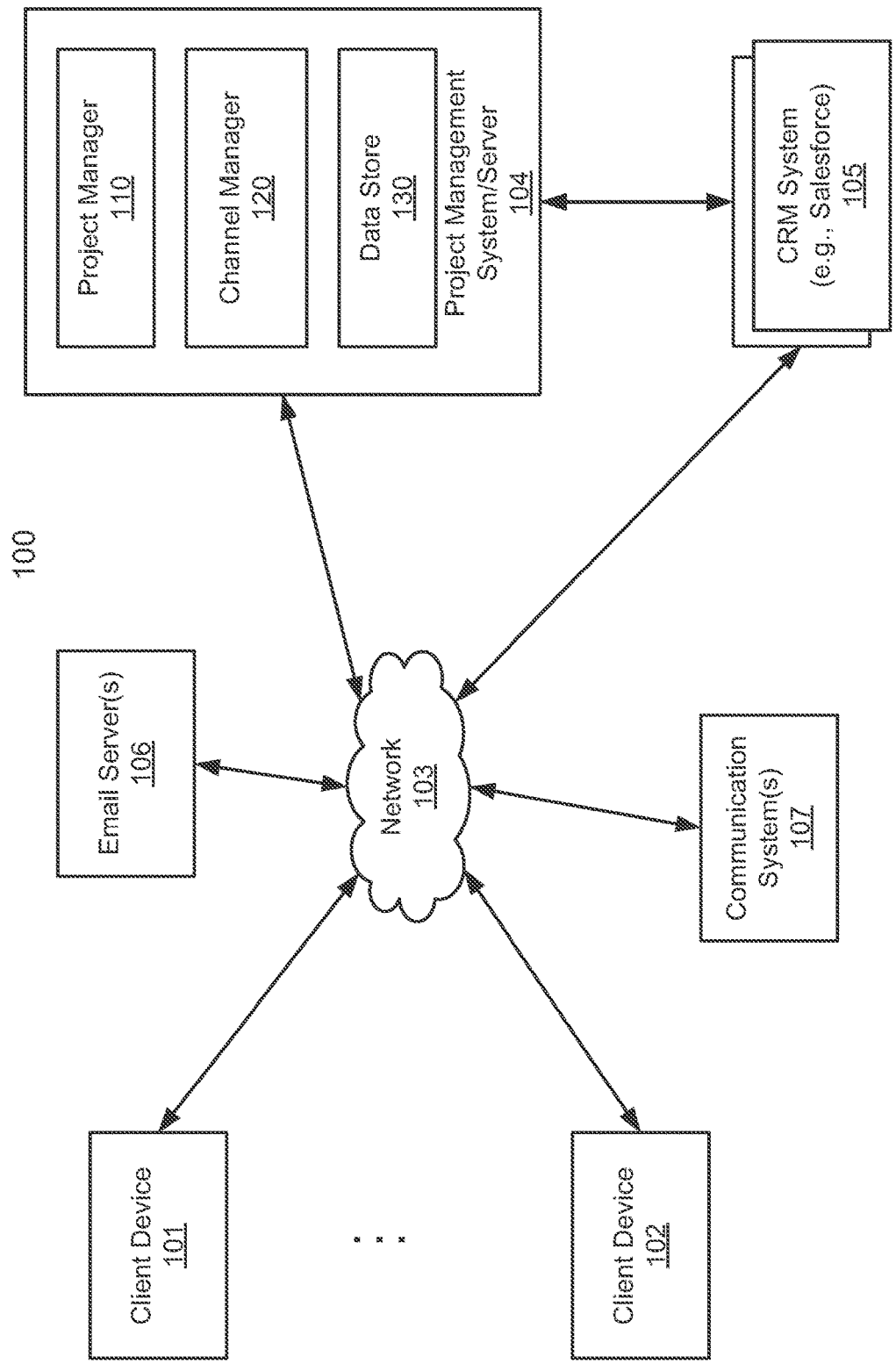
FIGS. 1A and 1B are block diagrams illustrating a network configuration according to certain embodiments of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a communication channel membership management system is utilized to automatically add and remove people who are most relevant to the projects. By doing so, users are freed of the burden of finding right person and bringing them up to speed. By automatically adding the right people at the right time, they are ramped up by following the conversation in the associated communication channels. The membership management system is tapping into multiple different sources of information to find the right people and the right time to add and remove.

The system is able to automatically detect characteristics of each project being worked on, and even the engagement styles of each individual user, manager, and other related individuals in order to manage team communication. For individual users, their time and effort required find the right people and to bring them up to speed is drastically reduced or eliminated. For managers, they can get automatically looped into the most important project discussions, helping their users when they are needed most. For users with specific roles (e.g., finance, legal, etc.), they can be included in a project flow only when their skills are needed.

According to one aspect of the invention, a customer relationship management (CRM) system is queried to obtain a list of projects that are associated with a particular user. A subset of the projects is selected from the list. Each of the projects in the subset includes an attribute that has been set to a predetermined attribute value or attribute state by the user (e.g., flagged, starred, a checkbox). For each of the projects in the subset, a communication channel (e.g., an instant messaging or IM system, an email group, a group chat, a social network community) associated with the project is identified. It is determined whether the user is already a member of the communication channel. If the user is not a member of the communication channel, the user is automatically added to the communication channel without user intervention from the user. As a result, the user is automatically brought in and can communicate with existing members of the communication channel to discuss further regarding the project. Automatically adding a user to a communication channel refers to a situation in which the user does not have to specifically join the communication channel. Rather, the system automatically adds the user in the communication channel without user intervention from the user.

According to another aspect of the invention, a communication system (e.g., an instant messaging or IM system, an email group, a group chat, a social network community) is queried to identify a list of communication channels that are associated with one or more Enterprise clients. For each of the communication channels, a CRM system is queried to identify a project associated with the communication channel. A current state of the project is examined to determine whether the current state of the project reaches a predetermined state (e.g., to be closed within a period of time, closed, won, or lost). In response to determining that the project reaches the predetermined state, one or more users having a specific user role (e.g., finance, legal people) are automatically added as members to the communication channel. The specific user role may be configured to be specifically associated with the predetermined state. Different user roles may be associated with different stages of a project. As a result, a user with a user role associated with a particular project state can be automatically added to the communication channel, once the project reaches that particular project state.

According to another aspect of the invention, an electronic calendar system associated with a user is queried to obtain a list of one or meetings that have been scheduled with in a predetermined period of time. The meetings may be related to one or more projects. For each of the meetings, one or more email addresses of one or more attendees are obtained from the electronic calendar system. For each of the email addresses, a domain name or domain identifier (ID) is determined from the email address. For each domain name, a CRM system is queried to obtain a list of one or more projects associated with an Enterprise client corresponding to the domain name. For each of the projects, it is determined whether the user is a member of a communication channel associated with the project. In response to determining that the user is not a member of the communication channel, the user is automatically added as a member to the communication channel.

According to a further aspect of the invention, a CRM system is queried to identify a list of projects. For each of the projects in the list, a current state of the project is examined to determine whether the state of the project reaches a predetermined state or stage. In response to determining that the state of the project has reached the predetermined state, a communication system is queried to identify a communication channel associated with the project. At least one member of the communication channel is automatically removed. In one embodiment, a member is removed from the communication channel only if there is no relevant activity or an amount of relevant activities is less than a predetermined threshold within a past predetermined period of time, for example, after the project reaches the predetermined stage. A relevant activity refers to an activity that is related to a particular member of a particular user role with respect to the associated project.

FIG. 1A is a block diagram illustrating a network configuration according to one embodiment of the invention. Referring to FIG. 1A, system 100 includes, but is not limited to, one or more client systems 101-102 communicatively coupled to servers 104-105 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Network 103 may be any type of networks such as a local area network (LAN), a wide area network (WAN) such as the Internet, or a combination thereof, wired or wireless. Servers 104-105 can be any kinds of servers or a cluster of servers, such as, for example, Web servers, application servers, cloud servers, backend servers, etc.

CRM system/server 105 provides CRM services to a variety of clients, which may be periodically or constantly accessed and updated by the clients for managing their CRM data or other project management data. CRM data includes any kinds of customer relationship management data, such as, for example, projects, tasks, deals, contracts, etc. The CRM services may be provided by a variety of CRM vendors, such as, for example Salesforce.com, SAP AG, Oracle, and Microsoft. CRM is a term that refers to practices, strategies and technologies that companies use to manage and analyze customer interactions and data throughout the customer lifecycle, with the goal of improving business relationships with customers, assisting in customer retention and driving sales growth. CRM systems are designed to compile information on customers across different channels or points of contact between the customer and the company, which could include the company's website, telephone, live chat, direct mail, marketing materials and social media.

In one embodiment, project management system or sever 104 (also referred to as a data analytics system or server) provides project management and/or data analytics services to clients 101-102 based on CRM data provided by CRM system 105 as a data source. Note that although there is only one CRM system shown, multiple CRM systems may also be implemented, where project management system 104 may be implemented as a multi-tenancy system that can access multiple CRM systems concurrently over network 103. For example, a user of client device 101 may be associated with a first organization as a first corporate client to project management system 104, while a user of client device 102 may be associated with a second organization as a second corporate client to data analytics system 104. The first and second organizations may employ different ones of CRM systems 105. Also note that a CRM system is utilized as an example of data sources, however, other types of data sources or systems can also be applied.

In one embodiment, project management system 104 includes, but it is not limited to, project manager 110, channel manager 120, and data store 130. The project management system 104 may further include a user interface, which can be any kind of user interface (e.g., Web, graphical user interface or GUI, or command line interface or CLI) that allows users of client devices 101-102 to access the services provided by project management system 104. In one embodiment, such a service may include automatic membership management of communication channels associated with a variety of projects. The membership management includes automatically adding and removing members of communication channels under a variety of circumstances. A project can be any kind of projects such as a sales project (also referred to as an opportunity).

Data store 130 stores or caches CRM data of a variety of projects, which may be periodically updated from the corresponding data source(s) or data provider(s), in this example, CRM system(s) 105. Alternatively, project manager 110 and/or channel manager 120 may directly access CRM system(s) 105 to query and retrieve the CRM data. Data stored in data store 130 can be maintained in a variety of data structures, such as tables or databases. Project manager 110 and/or channel manager 120 can access data store 130 via a variety of application programming interfaces (APIs), database queries, or other suitable communication protocols (e.g., structured query language or SQL).

In one embodiment, channel manager 120 is configured to automatically add and remove users who are most relevant to certain projects managed by project manager 110. By doing so, users are freed of the burden of finding right person and bringing them up to speed. By automatically adding the right people at the right time, they are ramped up by following the conversation in the associated communication channels. Project manager 110 and channel manager 120 are tapping into multiple different sources (e.g., CRM systems 105, email servers 106, and communication systems 107) of information to find the right people and the right time to add and remove.

The project manager 110 is able to automatically detect characteristics of each project (e.g., project stages) being worked on, and even the engagement styles of each individual user, manager, and other related individuals in order for channel manager 120 to manage team communication. For individual users, their time and effort required find the right people and to bring them up to speed is drastically reduced or eliminated. For managers, they can get automatically looped into the most important project discussions, helping their users when they are needed most. For users with specific roles (e.g., finance, legal, etc.), they can be included in a project flow only when their skills are needed (e.g., certain stages of projects).

Figure 1B:
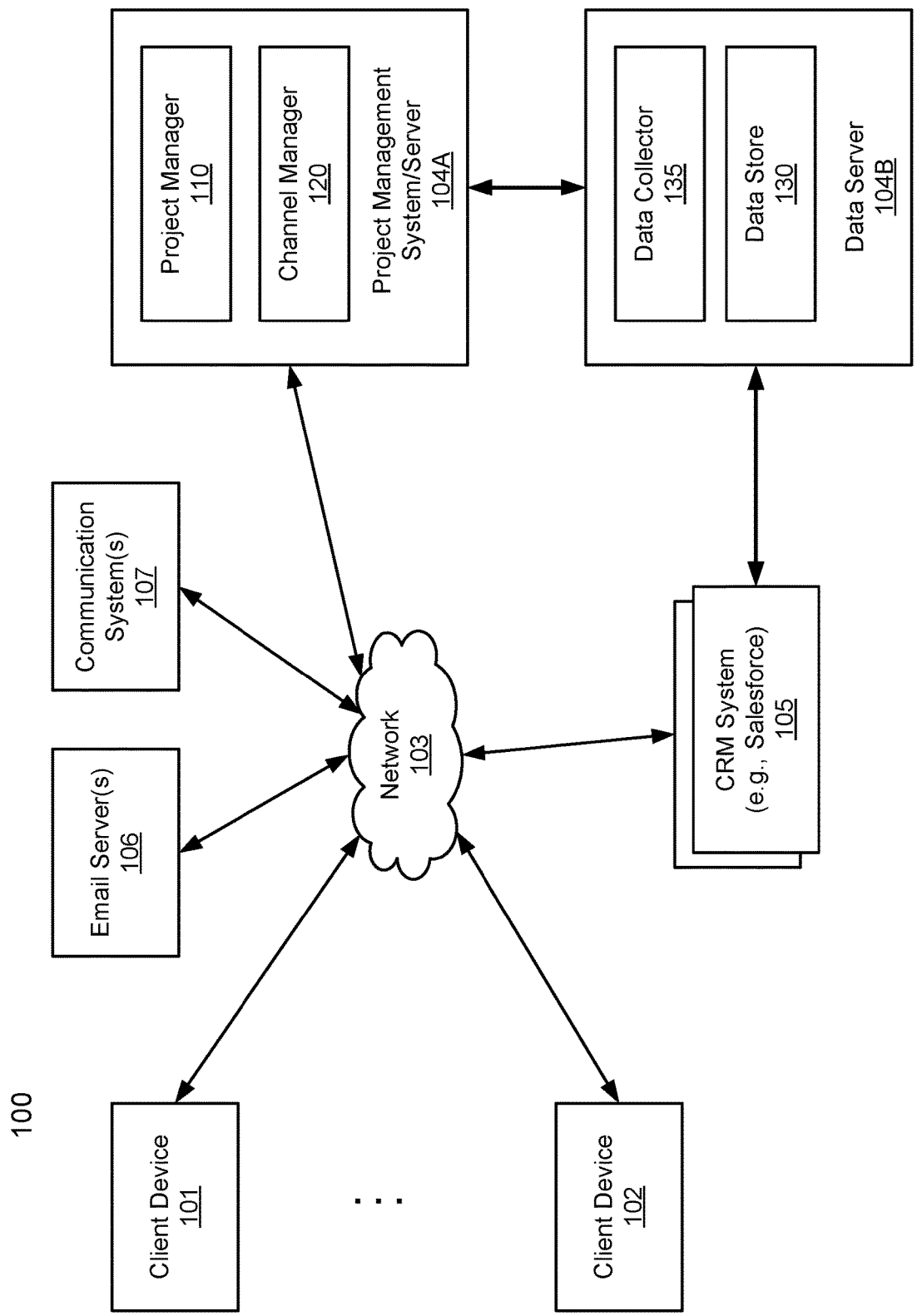

Although in this embodiment, data store 130 is maintained by project management system 104, however, data store 130 can be maintained in a dedicated data server that is a separate server from project management server 104 as shown in FIG. 1B. Referring now to FIG. 1B, in this embodiment, project management server 104A and data server 104B are implemented as separate servers, which may be operated by the same or different organizations or entities. Data store 130 is now maintained by data server 104B. Data server 104B further includes data collector 135 configured to periodically or constantly collect or update CRM data from data sources 105. Project management server 104A communicates with data server 104B using a variety of communication protocols to access task data stored in data store 130.

Figure 2:
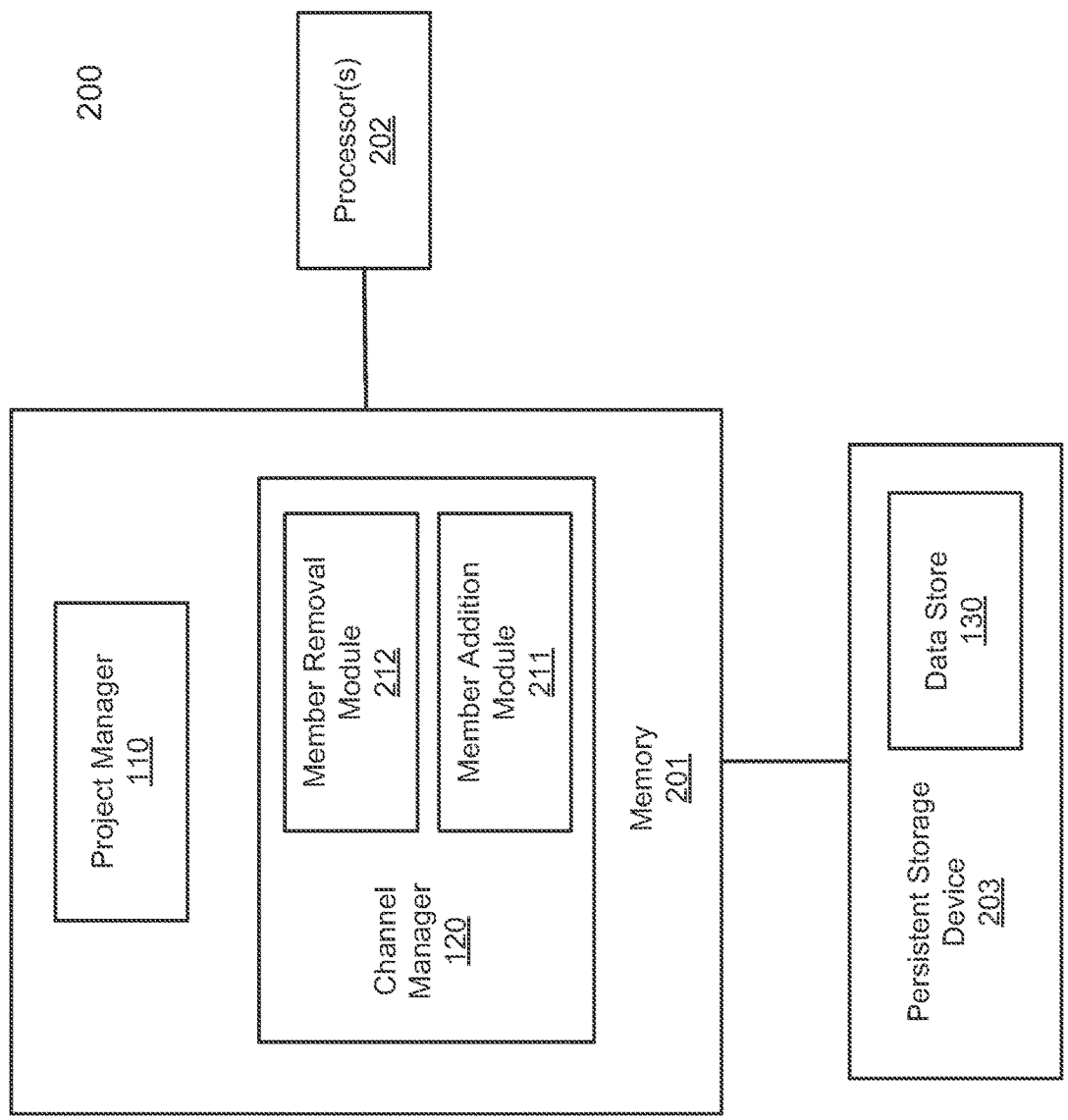
FIG. 2 is a block diagram illustrating an example of a project management system according to one embodiment of the invention.

FIG. 2 is a block diagram illustrating an example of a project management system according to one embodiment of the invention. System 200 may be implemented as part of project management system or server 104. Referring to FIG. 2, system 200 includes project manager 110 and channel manager 120 loaded in memory 201 (e.g., volatile memory such as random access memory or RAM) and executed by one or more processors 202 (e.g., microprocessors, central processing units or CPUs). Data store 130 is stored in persistent storage device 203, such as a hard disk, which may be maintained locally or remotely over a network. At least a portion of data stored in data store 130 may be cached in memory 201. In one embodiment, channel manager 120 includes member addition module 211 and member removal module 212. Member addition module 211 is responsible for automatically adding a user as a member to a communication channel associated with a project. Member removal module 212 is responsible for removing a member from a communication channel associated with a project.

Figure 3:
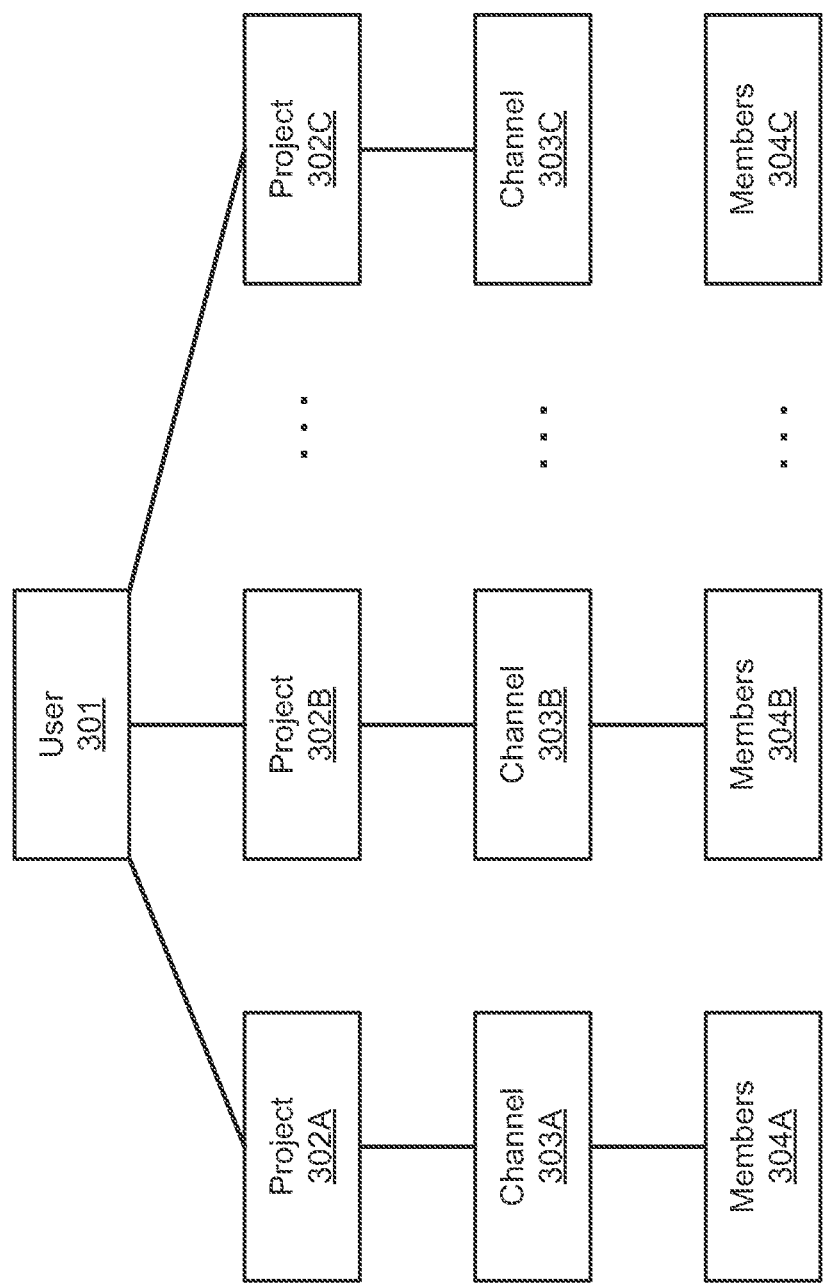
FIG. 3 is a block diagram illustrating an architecture of projects according to one embodiment of the invention.

A user can be associated with one or more projects and each project is associated with a communication channel to allow members of the communication channel to discuss the corresponding project as shown in FIG. 3. Referring to FIG. 3, user 301 may be associated with one or more projects 302A-302C. For example, user 301 may be an individual sales or customer representative working on projects 302A-302C concurrently. Alternatively, user 301 may be a manager or group leader of a team or group of individual users working on projects 302A-302C. Each of projects 302A-302C may be associated with the same or different enterprise clients (e.g., corporate clients). Each of projects 302A-302C is associated with a communication channel such as communication channels 303A-303C respectively. Each of channels 303A-303C can have one or more members such as members 304A-304C. A user can be automatically added to any of communication channels 303A-303C and can also be automatically removed from any of communication channels 303A-303C under certain circumstances.

Referring now to FIGS. 1A-1B and 2, according to one aspect of the invention, project manager 110 queries CRM system 105 obtain a list of projects that are associated with a particular user. CRM system 105 may be a CRM system associated with or utilized by an Enterprise client that the user is working with as a customer representative or sales representative. A subset of the projects is selected from the list. Each of the projects in the subset includes an attribute that has been set to a predetermined attribute value or attribute state by the user (e.g., flagged, starred, a checkbox). In one embodiment, when project manager 110 queries CRM system 105, it sends a query request to CRM system 105, where the query request includes certain parameters to specify the user and an attribute having a particular attribute value. In response, CRM system 105 searches based on the query request to identify and retrieve the list of projects that satisfy the query request. Alternatively, project manager 110 may perform filtering of projects to identify the subset of projects.

For each of the projects in the subset, channel manager 120 communicates with communication system 107 to identify a communication channel (e.g., an instant messaging or IM system, an email group, a group chat, a social network community) associated with the project. Note that communication system 107 may also be hosted within project management system 104. In one embodiment, membership addition module 211 determines whether the user is already a member of the communication channel. If the user is not a member of the communication channel, membership addition module 211 adds the user to the communication channel automatically without user intervention from the user. Membership addition module 211 may communicate with communication system 107 to determine the membership status of the user and add the user to the communication channel. In one embodiment, membership addition module 211 communicates with communication system 107 to determine whether the number of existing members of the communication channel has exceeded a predetermined threshold. The user is automatically added to the communication channel only if the number of existing members of the communication channel has not exceeded the predetermined threshold.

As a result, the user is automatically brought in and can communicate with existing members of the communication channel to discuss further regarding the project. The user does not have to specifically join the communication channel for the projects he or she has set the predetermined attribute to a predetermined attribute value.

For example, during daily operations, the user may access a project to mark the project as a "star" project via a user interface hosted by project management system 104. Alternatively, the user may directly access the project via a user interface of CRM system 105. Such setting of an attribute may be utilized to indicate that the user is interested in the project or the project is important to the user. By automatically scanning (e.g., via a background thread) the projects associated with a user to identify some of the projects that are deemed to be interesting or important to the user, the user can automatically get involved in the projects without requiring the user to specifically search for these projects and add itself to the corresponding communication channels.

According to one embodiment, project manager 110 may sort the list of projects obtained from CRM system 105 based on the size of each project. For a sales project, it is the size of the potential deal or contract (e.g., in dollar amount or revenue). Alternatively, the size of a project may refer to a number of licenses or contracts involved. A predetermined number of projects from the top based on the size are selected and the user is added to the corresponding communication channels of the selected projects from the top in size. Alternatively, projects having a project size above a predetermined threshold may be selected. In one embodiment, the search query sent by project manager 110 to CRM system 105 may include a parameter or attribute specifying only the top predetermined number of projects in size or the projects above a predetermined threshold in project size are retrieved. Each of the projects in the list may be owned by the user, for example, as a sales representative or a customer representative. Alternative, if the user has a specific role such as a group leader or team manager, the projects in the list may include the projects owned by the team members of the user group or team. A user as team manager may manage multiple teams or groups.

According to another embodiment, the projects in the list may be the projects that have reached a certain project state/stage or projected to reach a certain project state/stage within a predetermined period of time. Dependent upon the specific enterprise clients, for example, a project stage can be any one of "meeting scheduled," "prospecting," "discovery," "business validation," "customer validation," "manager to close," "closed—disqualified," "closed—won," and "closed—lost." For example, projects that will likely close within three months may be identified and the user is automatically added to their respective communication channels. In one embodiment, when project manager 120 queries CRM system 105 or data server 104B, the query request can include a search attribute or parameter to retrieve the projects that have reached a particular project stage or estimated to reach a particular project stage within a predetermined period of time. Note that the thresholds described above may be configurable by an administrator of a corresponding enterprise client.

Figure 4:
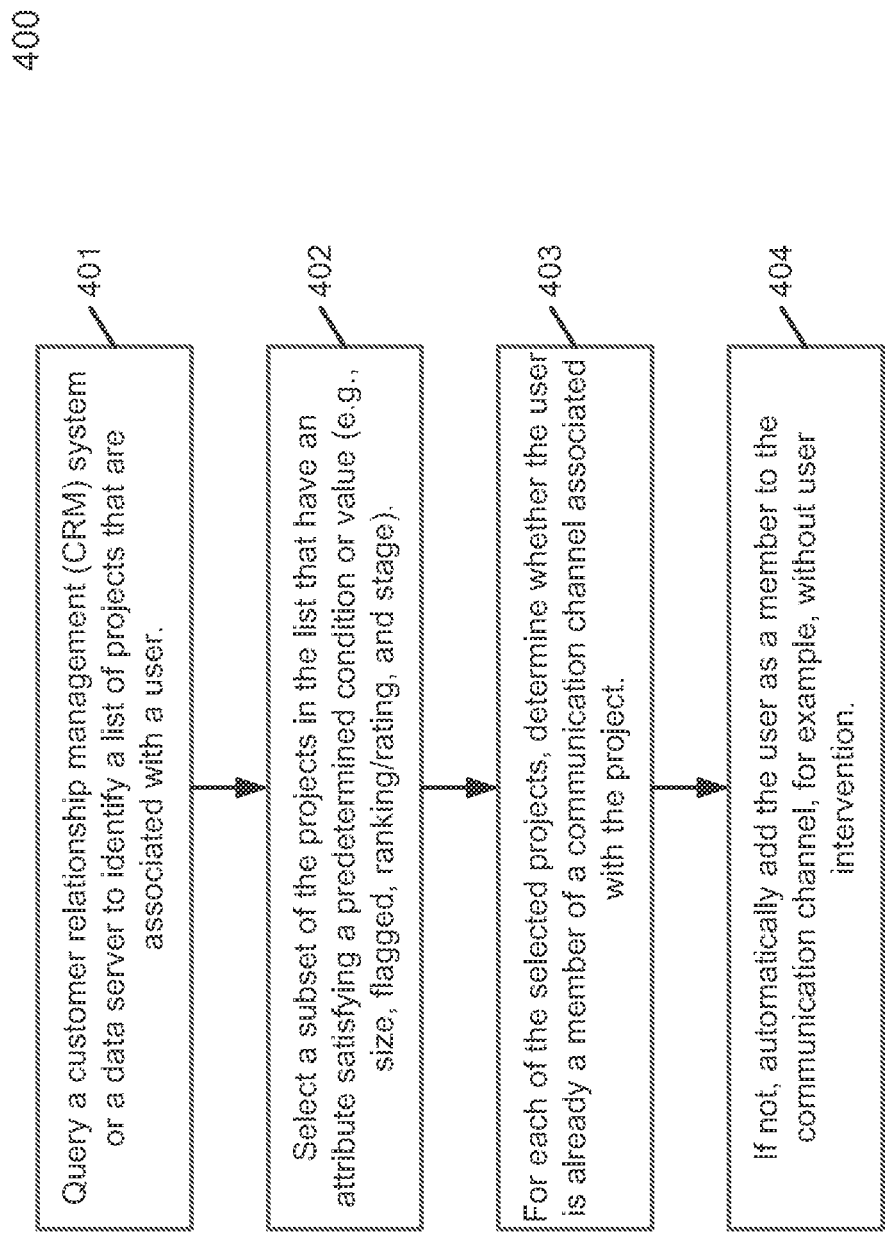
FIG. 4 is a flow diagram illustrating a process of managing membership of communication channels associated with projects according to one embodiment of the invention.

FIG. 4 is a flow diagram illustrating a process of managing membership of communication channels associated with projects according to one embodiment of the invention. Process 400 may be performed by processing logic which may include software, hardware, or a combination thereof. For example, process 400 may be performed by project manager 110 and/or channel manager 120. Referring to FIG. 4, in operation 401, processing logic queries a CRM system or data server to identify a list of projects that are associated with a user. In operation 402, processing logic selects a subset of the projects from the list that have a project attribute satisfying a predetermined condition or being set to a predetermined attribute value (e.g., size, flagged, user ranking/rating, and project stage/state). Alternatively, as described above, a search query may include information specifying these parameter when querying the CRM system or the data server.

For each of the selected projects, in operation 403, processing logic determines whether the user is a member of a communication channel associated with the project. In one embodiment, processing logic may communicate with a communication system to determine a communication channel associated with a project and to determine the existing members of the communication channel in order to determine whether the user is an existing member of the communication channel. In response to determining that the user is not a member of the communication channel, in operation 404, processing logic automatically adds the user as a member to the communication channel without user intervention of the user. Note that the above process may be automatically and periodically performed (e.g., a thread executed in the background or as a maintenance routine in the system) for at least some of the users in the system, for example, without user intervention of the users.

Referring back to FIGS. 1A-1B and 2, according to another aspect of the invention, channel manager 120 or an email processing module (not shown) of project management system 104 queries an electronic calendar system associated with a user, such as email server 106, to obtain a list of one or meetings that have been scheduled within a predetermined period of time (e.g., a past period of time). The meetings may be related to one or more projects. For each of the meetings, one or more email addresses of one or more attendees are obtained from the electronic calendar system. For each of the email addresses, a domain name or domain identifier (ID) is determined from the email address. Certain email addresses with certain domain names (e.g., internal domain names associated with the user) may be filtered out.

For each domain name, project manager 110 queries a CRM system 105 and/or data server 104B to obtain a list of one or more projects associated with an Enterprise client corresponding to the domain name. In one embodiment, the projects may be sorted based on a number of meetings associated with the project that have been scheduled. Only a subset of the projects having a number of meetings scheduled above a predetermined threshold may be selected. The rationale behind this is that if more meetings have been scheduled for a project, that particular project deems to be more important and the user needs to pay more attention. For each of the projects, channel manager 120 communicates with communication system 107 to determine whether the user is a member of a communication channel associated with the project. In response to determining that the user is not a member of the communication channel, channel manager 120 automatically adds the user as a member to the communication channel. In one embodiment, the user may be automatically added to the communication channel only if the number of existing members of the communication channel does not exceed a predetermined threshold. Alternatively, the user may be automatically added to the communication channel if the number of communication channels currently associated with the user is below a predetermined threshold. These thresholds may be configurable by an administrator. Furthermore, a user can also manually add itself into a particular communication channel.

Note that the above process may also be performed on the email data associated with the projects. An email processing module (not shown) may communicate with email server 106 to identify a list of emails associated with a project, for example, based on a domain name of the email addresses. If the number of emails exceeds a predetermined threshold, a user associated with the project is automatically added to a communication channel associated with that project. The rationale is that if there are more emails exchanged amongst the people involved in a project, that particular project may deem to be important and a sales representative or customer representative needs to pay attention.

Figure 5:
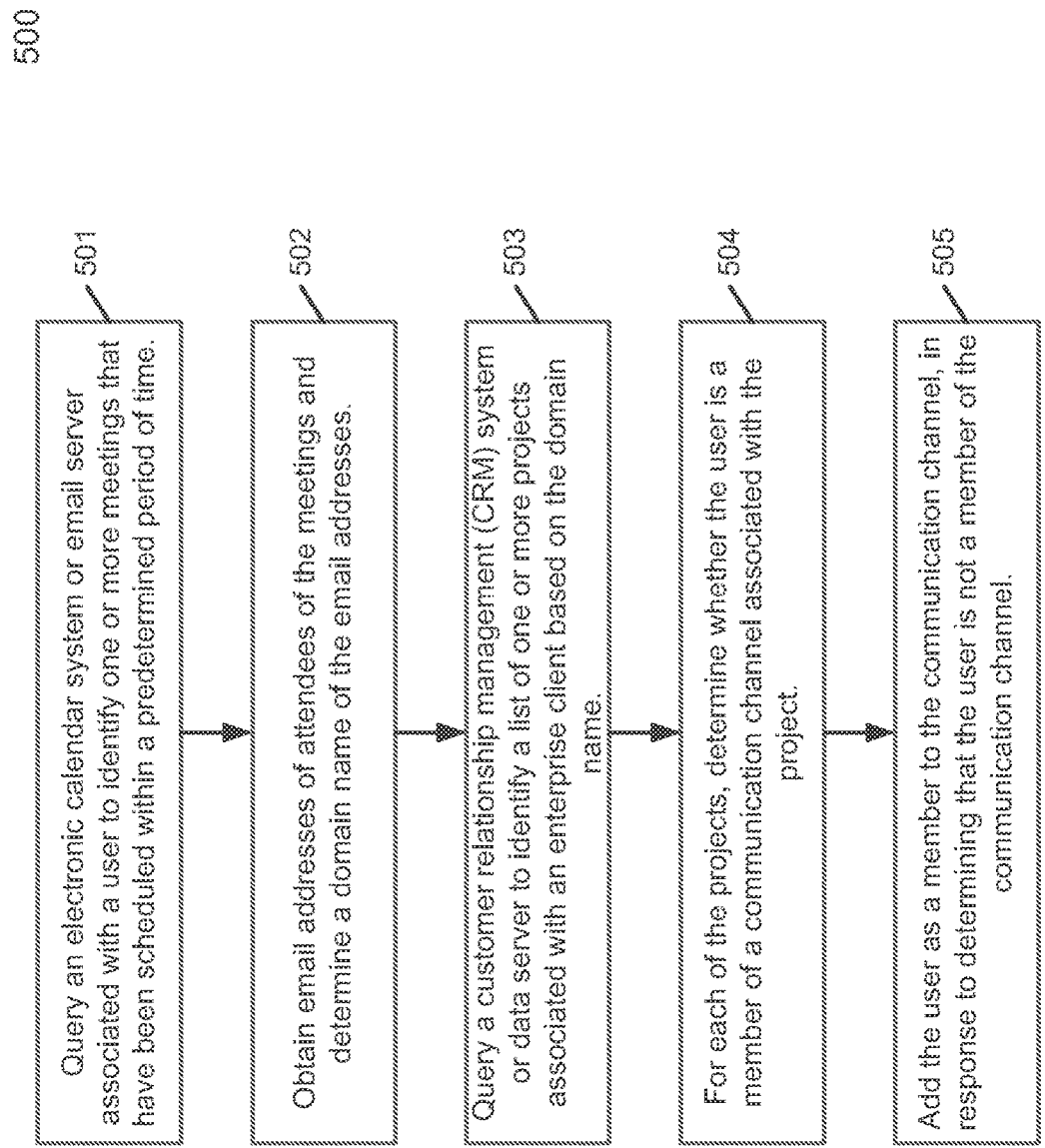
FIG. 5 is a flow diagram illustrating a process of managing membership of communication channels associated with projects according to another embodiment of the invention.

FIG. 5 is a flow diagram illustrating a process of managing membership of communication channels associated with projects according to another embodiment of the invention. Process 500 may be performed by processing logic which may include software, hardware, or a combination thereof. For example, process 500 may be performed by project manager 110 and/or channel manager 120. Referring to FIG. 5, in operation 501, processing logic queries an electronic calendar system of a user to identify a list of one or more meetings that have been scheduled within a predetermined period of time. In operation 502, processing logic obtains email addresses of attendees of the meetings from the electronic calendar system and determines a domain name or domain identifier for the email addresses.

In operation 503, processing logic queries a CRM system or a data server to identify a list of one or more projects associated with an enterprise client based on the domain name. For each of the projects, in operation 504, processing logic determines whether the user is a member of a communication channel associated with the project. In response to determining that the user is not a member of the communication channel, in operation 505, processing logic automatically adds the user as a member to the communication channel without user intervention. Note that the above process may be automatically and periodically performed (e.g., a thread executed in the background or as a maintenance routine in the system) for each of the users in the system, for example, without user intervention of the users.

Referring back to FIGS. 1A-1B and 2, according to another aspect of the invention, channel manager 120 queries communication system 107 (e.g., an instant messaging or IM system, an email group, a group chat, a social network community) to identify a list of communication channels that are associated with one or more Enterprise clients. For each of the communication channels, project manager 110 queries CRM system 105 or data server 104B to identify a project associated with the communication channel. Project manager 110 examines a current state of the project to determine whether the current state of the project has reached a predetermined stage or state. Project manager 110 may filter out the projects that have not reached the predetermined stage. Alternatively, a search query sent to the CRM system 105 or the data server may include a parameter or attribute specifying the project stage. In response to determining that the project has reached the predetermined stage, channel manager 120 automatically adds one or more users having a specific user role (e.g., finance, legal personnel) as members to the communication channel. The specific user role may be configured to be specifically associated with the predetermined stage by an administrator.

As a result, a user with a user role associated with a particular project state can be automatically added to the communication channel, once the project reaches that particular project state. In this embodiment, users who are not normally involved in a project during the earlier stages may be automatically added when the project reaches a predetermined stage. For example, for a sales project, typically, a sales representative is involved during the earlier stages of the project. When the project is about to be closed, for example, within 3 months, certain people such as finance and/or legal personnel may be needed, for example, in negotiating the price or drafting a sales contract. By scanning and detecting the stage of a project, the relative people may be automatically added at the right place and the right time.

Figure 6:
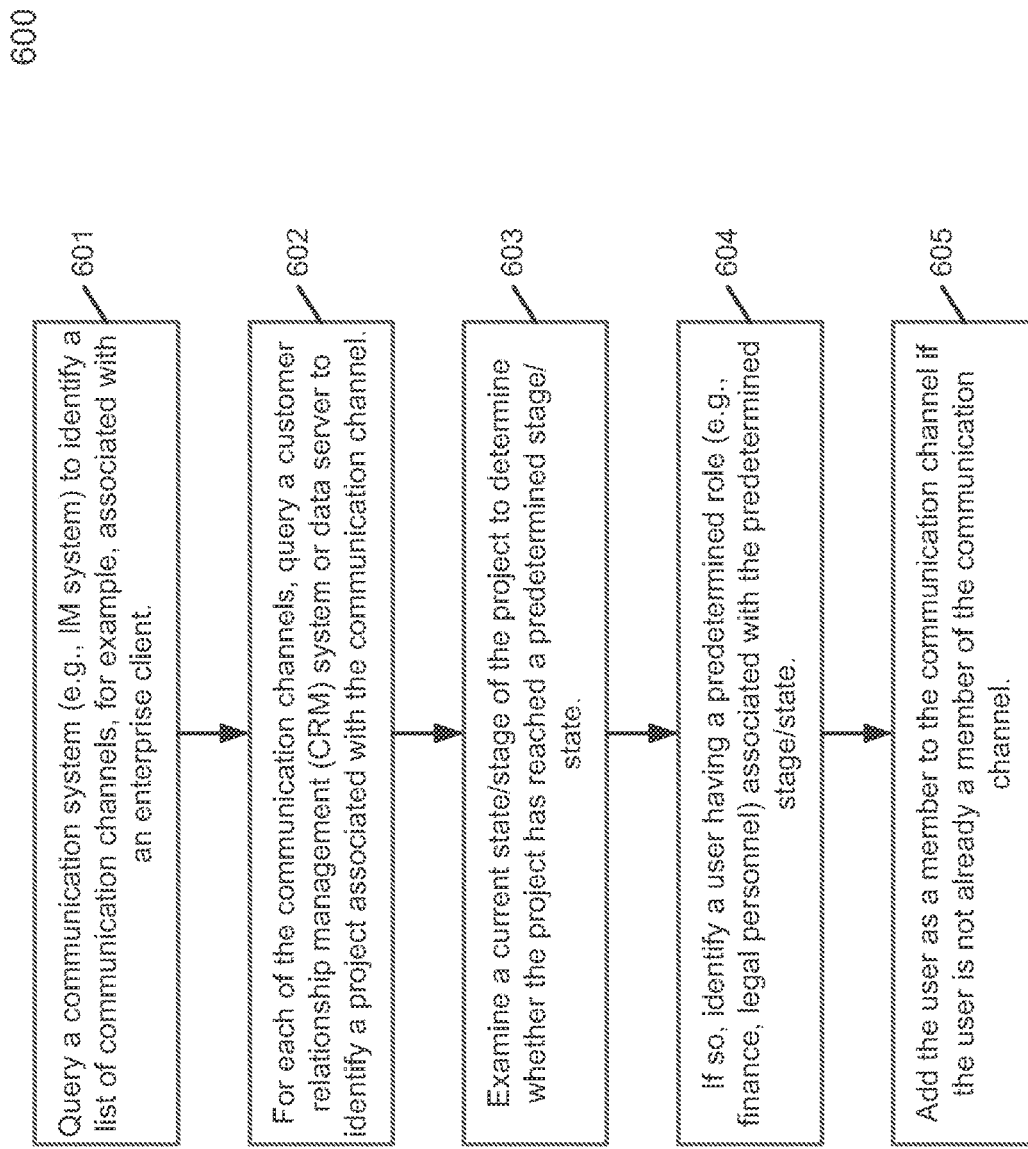
FIG. 6 is a flow diagram illustrating a process of managing membership of communication channels associated with projects according to another embodiment of the invention.

FIG. 6 is a flow diagram illustrating a process of managing membership of communication channels associated with projects according to another embodiment of the invention. Process 600 may be performed by processing logic which may include software, hardware, or a combination thereof. For example, process 600 may be performed by project manager 110 and/or channel manager 120. Referring to FIG. 6, in operation 601, processing logic queries a communication system (e.g., IM system) to identify a list of communication channels associated with a specific enterprise client or clients. For each of the communication channels, in operation 602, processing logic queries a CRM system to identify a project associated with the communication channel.

In operation 603, processing logic examines a current state or stage of the project to determine whether the current state of the project has reached a predetermined stage. If so, in operation 604, processing logic identifies a user having a specific user role (e.g., finance, legal) corresponding to the predetermined stage. In operation 605, processing logic adds the user to the communication channel as a member if the user is not a member of the communication channel. Note that the above process may be automatically and periodically performed (e.g., a thread executed in the background or as a maintenance routine in the system) for each of the users in the system, for example, without user intervention of the users.

Referring back to FIGS. 1A-1B and 2, according to another aspect of the invention, project manager 110 queries CRM system 105 or data server 104B to identify a list of projects. For each of the projects in the list, project manager 110 examines a current state of the project to determine whether the state of the project reaches a predetermined state or stage. In response to determining that the state of the project has reached the predetermined state, member removal module 212 of channel manager 120 queries communication system 107 to identify a communication channel associated with the project. Member removal module 212 automatically may remove one or more members from the communication channel. Note that a communication channel may still exist even if all members have been removed. Subsequently, a new member or a previously removed member can be added to the communication channel. In one embodiment, a member is removed from the communication channel only if there is no relevant activity or an amount of relevant activities is less than a predetermined threshold within a past predetermined period of time (e.g., 7 days), for example, after the project reaches the predetermined stage.

Figure 7:
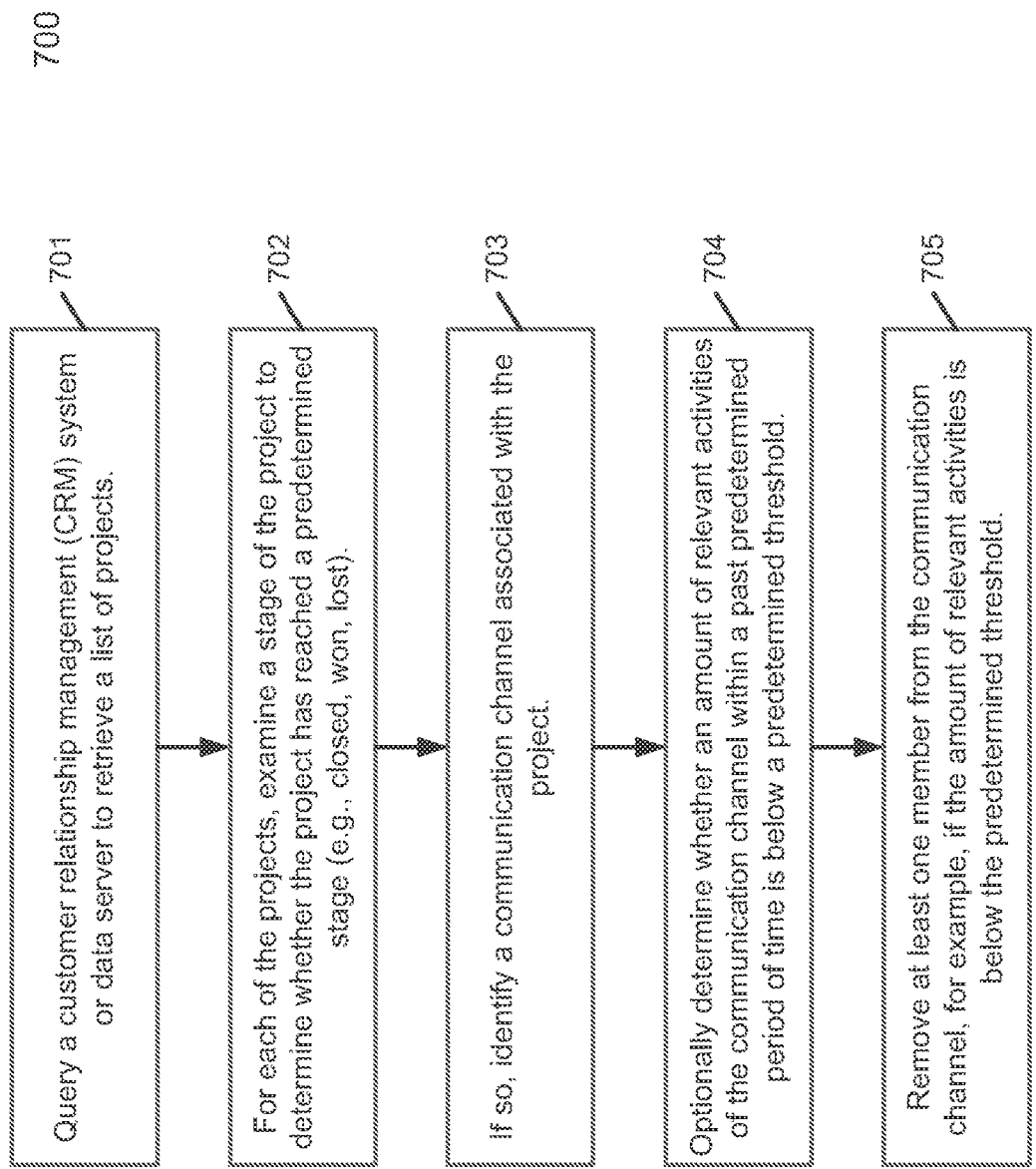
FIG. 7 is a flow diagram illustrating a process of managing membership of communication channels associated with projects according to another embodiment of the invention.
Figure 8:
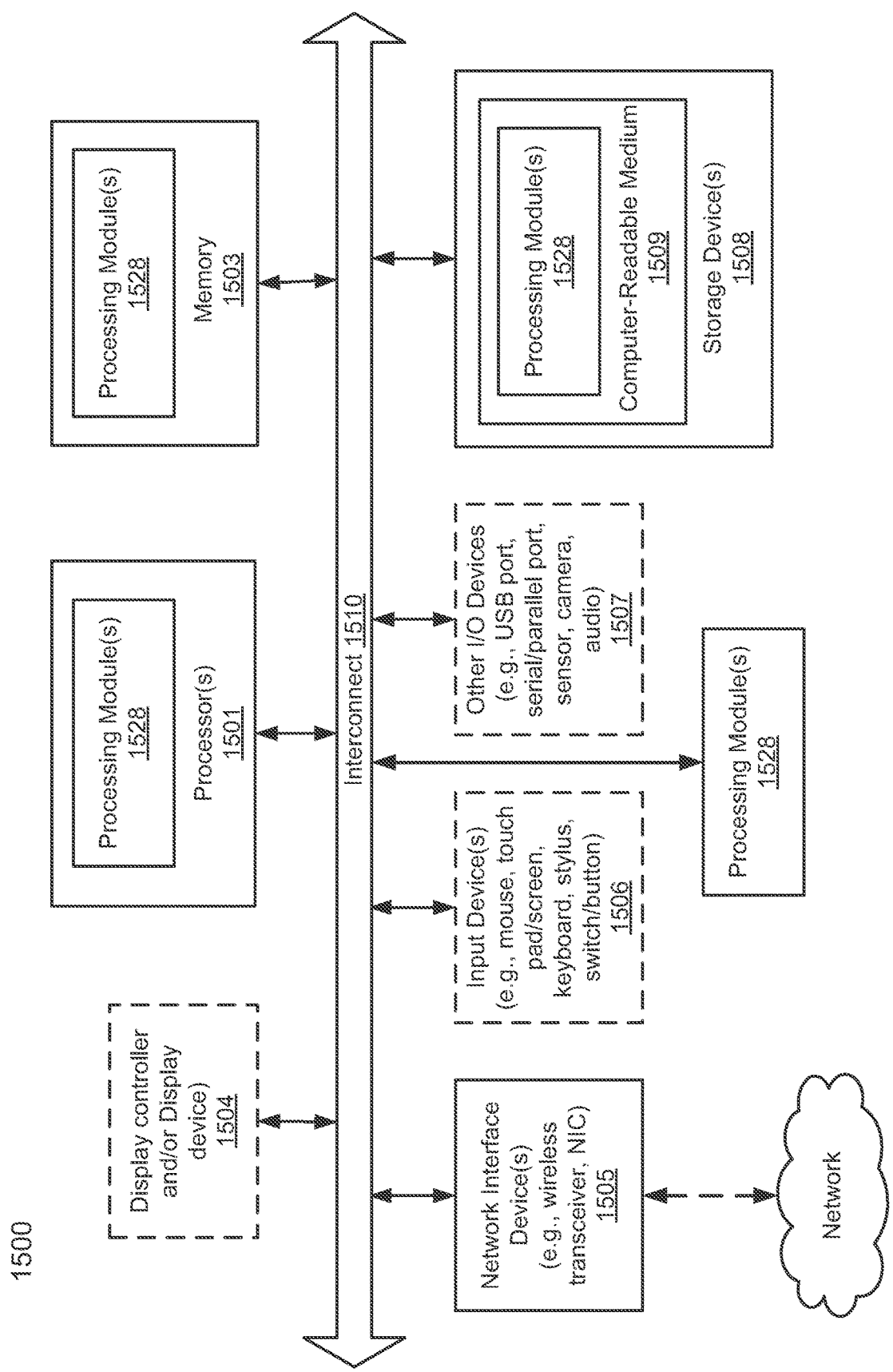
FIG. 8 is a block diagram illustrating a data processing system according to one embodiment.

FIG. 7 is a flow diagram illustrating a process of managing membership of communication channels associated with projects according to another embodiment of the invention. Process 700 may be performed by processing logic which may include software, hardware, or a combination thereof. For example, process 700 may be performed by project manager 110 and/or channel manager 120. Referring to FIG. 7, in operation 701, processing logic queries a CRM system to retrieve a list of projects. For each of the projects, in operation 702, processing logic examines the current state of the project to determine whether the current state of the project has reached a predetermined stage (e.g., closed, won, lost).

In operation 703, processing logic identifies a communication channel associated with the project, in response to determining that the project has reached the predetermined stage. In operation 704, processing logic optionally determines whether there is any relevant activity of the communication channel within a past predetermined period of time or whether an amount of relevant activities dropped below a predetermined threshold. In operation 705, processing logic may remove one or more members from the communication channel, for example, if an amount of relevant activities is below a predetermined threshold. A relevant activity refers to an activity that is related to a particular member of a particular user role with respect to the associated project. For example, when a sales project reaches a particular stage, a user with a sales representative may not be needed and only the legal or finance personnel may be needed. In such a scenario, the user with the sales representative role may be removed from the communication channel, while the legal or finance people may remain. Note that the above process may be automatically and periodically performed (e.g., a thread executed in the background or as a maintenance routine in the system) for each of the users in the system, for example, without user intervention of the users.

Note that some or all of the components as shown and described above (e.g., project manager 110 and channel manager 120 of FIGS. 1A-1B and 2) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, project manager 110 and/or channel manager 120. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method of managing electronic communication channels using a data processing system, the method comprising:
  querying, by a data analytics server via a first application programming interface (API), a database to obtain a first list of data entities, wherein each of the data entities includes information of a task expected to be completed within a predetermined period of time, and wherein each task is processed according to a plurality of predetermined states that are in a sequential order and define a life cycle of the corresponding task;
  using a background thread running in the data processing system, automatically selecting a subset of the data entities from the first list based on at least one of the following criteria: each data entity in the subset of data entities includes an attribute indicating that the data entity is flagged, each data entity in the subset of data entities is in a first state of the plurality of predetermined states, each data entity in the subset of data entities has reached the first state within a same period of time, or each data entity in the subset of data entities has an estimated time frame in which the data entity is to move from the first state to a second state in the plurality of predetermined states;
  for each data entity in the subset of data entities,
  automatically identifying a first list of a plurality of electronic communication channels associated with the corresponding data entity, wherein the electronic communication channels include at least one of an instant messaging system, an email group, a group chat, or a social network community, wherein each of the plurality of electronic communication channels enables electronic communication over an electronic network,
  automatically determining whether a first user is in a first user role associated with the first state of the corresponding data entity,
  automatically identifying a first electronic communication channel of the plurality of electronic communication channels of which the first user is not a member,
  in response to determining that the first user is not a member of the first electronic communication channel and that the first user is in the first user role, determining whether a number of existing members of the first electronic communication channel exceeds a first predetermined threshold and a number of electronic communication channels associated with the user is below a second predetermined threshold;
  in response to determining that the number of existing members of the first electronic communication channel does not exceed the first predetermined threshold, and that the number of electronic communication channels associated with the first user is below a second predetermined threshold, automatically adding the first user as a member to the first electronic communication channel, such that the first user can communicate with another member of the first electronic communication channel,
  automatically determining whether the data entity has reached the second state in the plurality of predetermined states, and in response to determining that the data entity has reached the second state, automatically identifying a second electronic communication channel of the plurality of electronic communication channels, wherein the second electronic communication channel includes a second user as a member of the second electronic communication channel,
  automatically determining that the second user is in a second user role associated with the second state,
  automatically determining that an amount of activities performed by the second user is below a predetermined amount, and
  automatically removing the second user from the second communication channel, in response to determining that the second user is in the second user role and the amount of activities is below the predetermined amount;
  updating the database and an electronic communications system via a second API regarding the added first user and the removed second user.

2. The method of claim 1, wherein the attribute of each of the data entities in the subset indicates whether the first user has flagged the data entity.

3. The method of claim 1, further comprising sorting the data entities in the first list based on a size of each data entity, wherein the subset of the data entities is selected from a predetermined number of data entities according to a sorted order.

4. The method of claim 1, wherein the first list of data entities is owned by the first user or owned by a user group associated with the first user.

5. The method of claim 1, further comprising:
  querying the electronic communications system via the second API to identify a second list of electronic communication channels associated with a client;
  for each of the electronic communication channels in the second list, querying the database via the first API to identify a second data entity associated with the electronic communication channel;
  examining a current state of the data entity to determine whether the current state of the data entity satisfies a third state; and
  adding, automatically without user intervention, a third user having a third user role as a member to the electronic communication channel, in response to determining that the current state of the second data entity satisfies the third state.

6. The method of claim 5, wherein the third user role represents a group leader of a user group.

7. The method of claim 1, further comprising:
  querying the database via the first API to identify a second list of a plurality of data entities;
  for each of the data entities in the second list, examining a current state of the data entity to determine whether the current state of the data entity satisfies a predetermined state;
  querying the electronic communications system via the second API based on the data entity to identify an electronic communication channel associated with the data entity, in response to determining that the current state of the data entity satisfies the predetermined state; and
  removing, automatically without user intervention, at least one member from the identified electronic communication channel.

8. The method of claim 1, further comprising:
  querying an electronic calendar system via a third API associated with a fourth user to obtain a list of one or more meetings that have been scheduled within a predetermined time period;
  obtaining, from the electronic calendar system via the third API, a plurality of email addresses of a plurality of attendees of the one or more meetings;

for each of the email addresses, determining a domain name of the email address;

querying the database via the first API to obtain a second list of one or more data entities associated with the domain name;

for each of the data entities in the second list, determining whether the fourth user is a member of an electronic communication channel associated with the data entity; and adding, automatically without user intervention, the fourth user as a member to the electronic communication channel associated with the data entity, in response to determining that the fourth user is not a member of the electronic communication channel associated with the data entity.

9. The method of claim 8, further comprising removing email addresses having a domain name that is associated with an organization of the user.

10. The method of claim 8, further comprising sorting the data entities in the second list based on a number of meetings associated with each data entity, wherein the fourth user is added to electronic communication channels of a subset of the data entities selected according to a sorted order.

11. A non-transitory machine-readable medium having instructions stored therein, which when executed by a processor, cause the processor to perform operations of managing electronic communication channels using a data processing system, the operations comprising:

querying, via a first application programming interface (API), a database to obtain a first list of data entities, wherein each of the data entities includes information of a task expected to be completed within a predetermined period of time, and wherein each task is processed according to a plurality of predetermined states that are in a sequential order and define a life cycle of the corresponding task;

using a background thread running in the data processing system, automatically selecting a subset of the data entities from the first list based on at least one of the following criteria: each data entity in the subset of data entities includes an attribute indicating that the data entity is flagged, each data entity in the subset of data entities is in a first state of the plurality of predetermined states, each data entity in the subset of data entities has reached the first state within a same period of time, or each data entity in the subset of data entities has an estimated time frame in which the data entity is to move from the first state to a second state in the plurality of predetermined states;

for each data entity in the subset of data entities, automatically identifying a first list of a plurality of electronic communication channels associated with the corresponding data entity, wherein the electronic communication channels include at least one of an instant messaging system, an email group, a group chat, or a social network community, wherein each of the plurality of electronic communication channels enables electronic communication over an electronic network, automatically determining whether a first user is in a first user role associated with the first state of the corresponding data entity, automatically identifying a first electronic communication channel of the plurality of electronic communication channels of which the first user is not a member, in response to determining that the first user is not a member of the first electronic communication channel and that the first user is in the first user role, determining whether a number of existing members of the first electronic communication channel exceeds a first predetermined threshold and a number of electronic communication channels associated with the user is below a second predetermined threshold;

in response to determining that the number of existing members of the first electronic communication channel does not exceed the first predetermined threshold, and that the number of electronic communication channels associated with the first user is below a second predetermined threshold, automatically adding the first user as a member to the first electronic communication channel, such that the first user can communicate with another member of the first electronic communication channel, automatically determining whether the data entity has reached the second state in the plurality of predetermined states, and in response to determining that the data entity has reached the second state, automatically identifying a second electronic communication channel of the plurality of electronic communication channels, wherein the second electronic communication channel includes a second user as a member of the second electronic communication channel, automatically determining that the second user is in a second user role associated with the second state, automatically determining that an amount of activities performed by the second user is below a predetermined amount, and automatically removing the second user from the second communication channel, in response to determining that the second user is in the second user role and the amount of activities is below the predetermined amount;

updating the database and an electronic communications system via a second API regarding the added first user and the removed second user.

12. The machine-readable medium of claim 11, wherein the attribute of each of the data entities in the subset indicates whether the first user has flagged the data entity.

13. The machine-readable medium of claim 11, wherein the operations further comprise sorting the data entities in the first list based on a size of each data entity, wherein the subset of the data entities is selected from a predetermined number of data entities according to a sorted order.

14. The machine-readable medium of claim 11, wherein the first list of data entities is owned by the first user or owned by a user group associated with the first user.

15. The machine-readable medium of claim 11, wherein the operations further comprise:

querying the electronic communications system via the second API to identify a second list of electronic communication channels associated with a client;

for each of the electronic communication channels in the second list, querying the database via the first API to identify a second data entity associated with the electronic communication channel;

examining a current state of the data entity to determine whether the current state of the data entity satisfies a third state; and adding, automatically without user intervention, a third user having a third user role as a member to the electronic communication channel, in response to determining that the current state of the second data entity satisfies the third state.

16. The machine-readable medium of claim 15, wherein the third user role represents a group leader of a user group.

17. The machine-readable medium of claim 11, wherein the operations further comprise:
  querying the database via the first API to identify a second list of a plurality of data entities;
  for each of the data entities in the second list, examining a current state of the data entity to determine whether the current state of the data entity satisfies a predetermined state;
  querying the electronic communications system via the second API based on the data entity to identify an electronic communication channel associated with the data entity, in response to determining that the current state of the data entity satisfies the predetermined state; and
  removing, automatically without user intervention, at least one member from the identified electronic communication channel.

18. The machine-readable medium of claim 11, wherein the operations further comprise:
  querying an electronic calendar system via a third API associated with a fourth user to obtain a list of one or more meetings that have been scheduled within a predetermined time period;
  obtaining, from the electronic calendar system via the third API, a plurality of email addresses of a plurality of attendees of the one or more meetings;
  for each of the email addresses, determining a domain name of the email address;
  querying the database via the first API to obtain a second list of one or more data entities associated with the domain name;
  for each of the data entities in the second list, determining whether the fourth user is a member of an electronic communication channel associated with the data entity; and
  adding, automatically without user intervention, the fourth user as a member to the electronic communication channel associated with the data entity, in response to determining that the fourth user is not a member of the electronic communication channel associated with the data entity.

19. The machine-readable medium of claim 18, wherein the operations further comprise removing email addresses having a domain name that is associated with an organization of the user.

20. The machine-readable medium of claim 18, wherein the operations further comprise sorting the data entities in the second list based on a number of meetings associated with each data entity, wherein the fourth user is added to electronic communication channels of a subset of the data entities selected according to a sorted order.

21. A data processing system, comprising:
  a processor; and
  a memory coupled to the processor storing instructions, which when executed by the processor, cause the processor to perform operations, the operations including:
    querying, via a first application programming interface (API), a database to obtain a first list of data entities, wherein each of the data entities includes information of a task expected to be completed within a predetermined period of time, and wherein each task is processed according to a plurality of predetermined states that are in a sequential order and define a life cycle of the corresponding task;
    using a background thread running in the data processing system, automatically selecting a subset of the data entities from the first list based on at least one of the following criteria: each data entity in the subset of data entities includes an attribute indicating that the data entity is flagged, each data entity in the subset of data entities is in a first state of the plurality of predetermined states, each data entity in the subset of data entities has reached the first state within a same period of time, or each data entity in the subset of data entities has an estimated time frame in which the data entity is to move from the first state to a second state in the plurality of predetermined states;
    for each data entity in the subset of data entities,
    automatically identifying a first list of a plurality of electronic communication channels associated with the corresponding data entity, wherein the electronic communication channels include at least one of an instant messaging system, an email group, a group chat, or a social network community, wherein each of the plurality of electronic communication channels enables electronic communication over an electronic network,
    automatically determining whether a first user is in a first user role associated with the first state of the corresponding data entity,
    automatically identifying a first electronic communication channel of the plurality of electronic communication channels of which the first user is not a member,
    in response to determining that the first user is not a member of the first electronic communication channel and that the first user is in the first user role, determining whether a number of existing members of the first electronic communication channel exceeds a first predetermined threshold and a number of electronic communication channels associated with the user is below a second predetermined threshold;
    in response to determining that the number of existing members of the first electronic communication channel does not exceed the first predetermined threshold, and that the number of electronic communication channels associated with the first user is below a second predetermined threshold, automatically adding the first user as a member to the first electronic communication channel, such that the first user can communicate with another member of the first electronic communication channel,
    automatically determining whether the data entity has reached the second state in the plurality of predetermined states, and in response to determining that the data entity has reached the second state, automatically identifying a second electronic communication channel of the plurality of electronic communication channels, wherein the second electronic communication channel includes a second user as a member of the second electronic communication channel,
    automatically determining that the second user is in a second user role associated with the second state,
    automatically determining that an amount of activities performed by the second user is below a predetermined amount, and
    automatically removing the second user from the second communication channel, in response to determining that the second user is in the second user role and the amount of activities is below the predetermined amount;
    updating the database and an electronic communications system via a second API regarding the added first user and the removed second user.

22. The system of claim 21, wherein the attribute of each of the data entities in the subset indicates whether the first user has flagged the data entity.

* * * * *